(12) United States Patent
Ellison et al.

(10) Patent No.: US 8,177,612 B2
(45) Date of Patent: May 15, 2012

(54) SYSTEM AND METHOD FOR PLAYING A GAME INVOLVING THE CONVERSION OF A COMMUNICATED MESSAGE TO A TEXT MESSAGE

(75) Inventors: David E. Ellison, Lake Worth, FL (US); Scott Ackerman, Sarasota, FL (US)

(73) Assignee: Mach 5 Products, Lake Worth, FL (US)

( * ) Notice: Subject to any disclaimer, the term of this patent is extended or adjusted under 35 U.S.C. 154(b) by 677 days.

(21) Appl. No.: 12/238,166

(22) Filed: Sep. 25, 2008

(65) Prior Publication Data

US 2009/0082096 A1    Mar. 26, 2009

Related U.S. Application Data

(60) Provisional application No. 60/960,314, filed on Sep. 25, 2007.

(51) Int. Cl.
*A63F 9/24* (2006.01)
(52) U.S. Cl. .............................. 463/9; 463/25
(58) Field of Classification Search ............... 463/9, 25
See application file for complete search history.

(56) References Cited

U.S. PATENT DOCUMENTS

| | | | | |
|---|---|---|---|---|
| 5,816,918 A * | 10/1998 | Kelly et al. | ..................... | 463/16 |
| 6,015,344 A * | 1/2000 | Kelly et al. | ..................... | 463/16 |
| 6,193,606 B1 * | 2/2001 | Walker et al. | .................. | 463/20 |
| 2006/0293956 A1 * | 12/2006 | Walker et al. | .................. | 705/14 |

OTHER PUBLICATIONS

The Rosetta Stone Language Library,"Online Users Guide, Fairfield Language Technologies," Copyright 2001.*

* cited by examiner

*Primary Examiner* — Omkar Deodhar
(74) *Attorney, Agent, or Firm* — Andrew C. Aitken (57) ABSTRACT

This invention is directed to amusement devices wherein players attempt to rapidly convert target messages into a "text message" using a conventional keypad arrangement such as that provided on a push button phone. The target message is the message that is intended to be translated may be communicated to the player using a visual display or be provided to a player orally. The object of the game is to accurately convert the target message to a "text message" as rapidly as possible using the keypad and the translated message is sent from the keypad data entry device to a central processing unit where it is then displayed and provided a score or rank according to predetermined scoring criteria.

11 Claims, 5 Drawing Sheets

SYSTEM AND METHOD FOR PLAYING A GAME INVOLVING THE CONVERSION OF A COMMUNICATED MESSAGE TO A TEXT MESSAGE

PRIORITY CLAIM

The applicants claim the benefit of the filing date of U.S. Application No. 60/960,314 filed on Sep. 25, 2007.

SUMMARY OF THE INVENTION

The following invention relates to both game software and hardware that is appealing to people of all ages. The invention is directed to amusement devices wherein players attempt to rapidly convert target messages—which are provided to the players in conventional language—into a "text message" using a conventional keypad arrangement such as that provided on a push button or cellular phone. The target message is the message that is intended to be translated may be communicated to the player using a visual display or be provided to a player orally. The object of the game is to accurately convert the target message to a "text message" as rapidly as possible, by using the fewest number of characters or numbers or both, using the keypad arranged like a conventional telephone keypad. The translated message is sent from the keypad data entry device to a central processing unit where it is displayed and provided a score or rank according to predetermined scoring criteria. In a preferred embodiment, the translation of each character in the target message proceeds until a correct match is entered on the keypad. Upon entry of a correct translation, a visual indication is displayed and an indication is provided for the next character to be translated.

DETAILED DESCRIPTION

Figure 1:
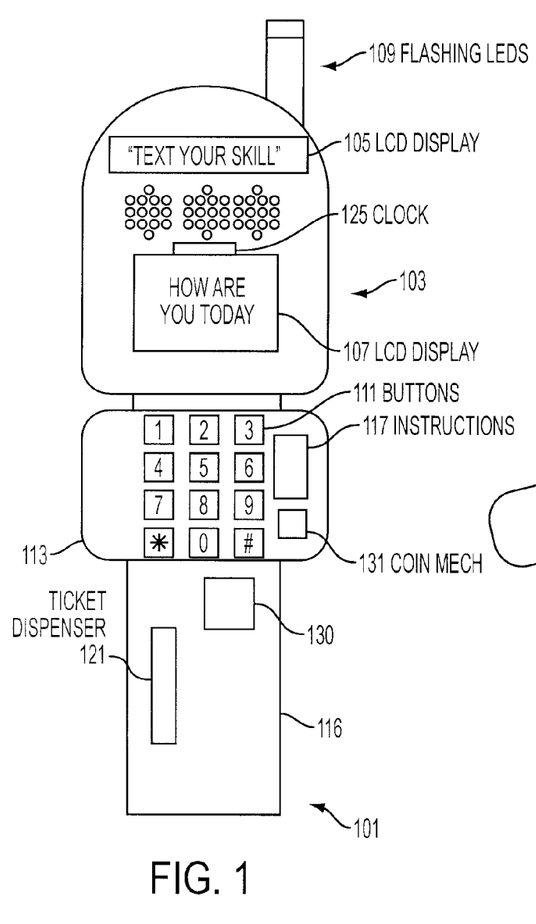
FIG. 1 is a schematic depiction of an embodiment of the game according to the invention as used in an arcade wherein the amusement device includes a ticket dispenser.
Figure 2:
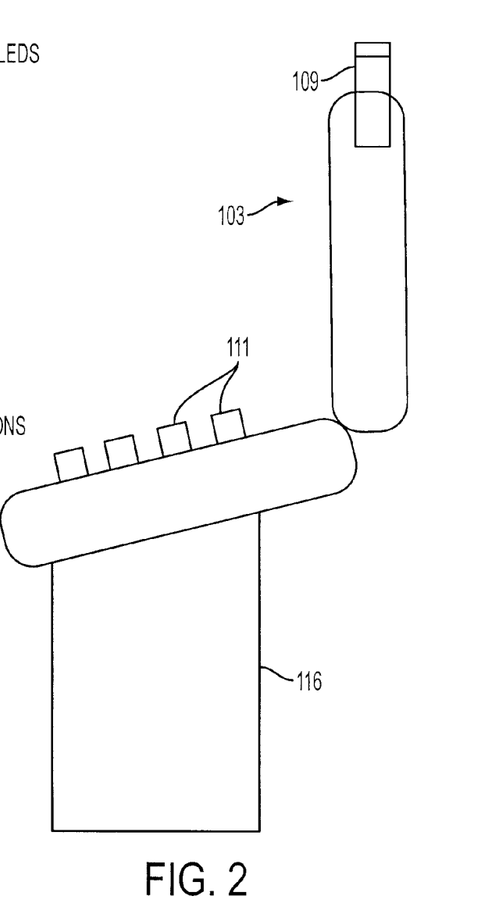
FIG. 2 is a side version of the embodiment depicted in FIG. 1.
Figure 3:
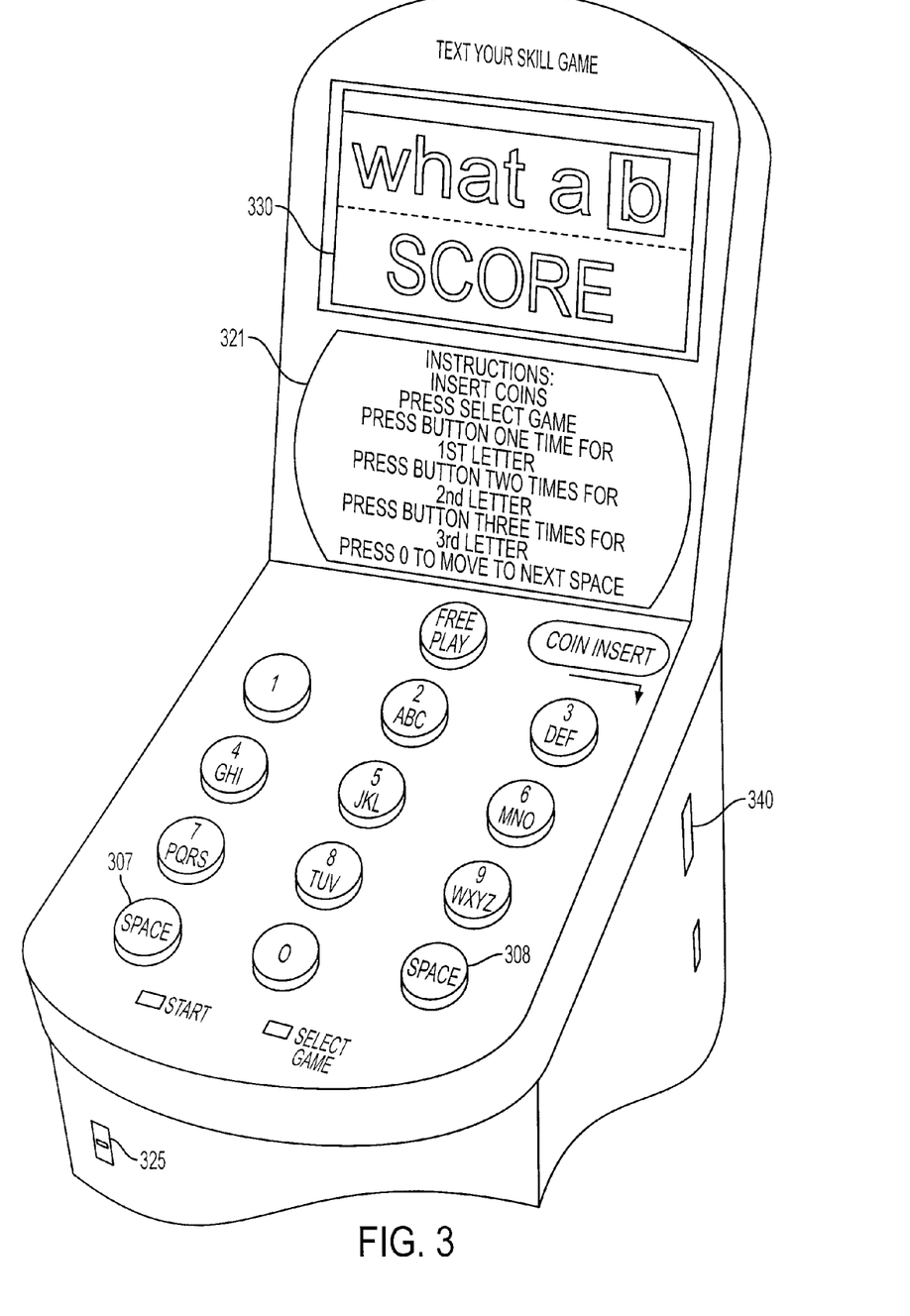
FIG. 3 is a perspective view of a depiction of the device including an LCD display panel.

Now referring to FIG. 1, in a first embodiment, a stand alone arcade redemption game is disclosed that includes a target message and test message display panel 107, a keyboard 113 for data entry that simulates a cellular phone keyboard, a central processor, a coin or credit acceptor 130, and a ticket dispenser 121. In this first embodiment a player activates the game by providing coins, tokens or credits into credit acceptor 130. In this preferred embodiment the player may then select a theme, such as "High School Dance," "Going to the Mall," or "A Day at the Beach." See FIG. 3, select game switch. The select game switch is in communication with the processor and also provides other game options including multilayer games and different scoring heuristics. In one scoring heuristic the score is based upon the total time it take to complete a correct translation of the entire text message. In a second scoring heuristic, the translation of each target letter is separately scored and each displayed target letter has a maximum and minimum value. In response to a credit switch and then a game selection and game initiation step, a first target message is displayed on display panel 107 and the keyboard 113 is enabled. The player then provides input by pressing the keypad to create a text message that corresponds to the target message. The text message is displayed on the panel 111 and, after a predetermined time has elapsed without any input form the input keypad device, the curser or other indicator moves to the next character in the target message. In an alternative mode, when the player is satisfied with the translated character the player may move the curser to the next target character with a space key 150. A clock 125 is also displayed which starts a count when the target message is first displayed and elapses as the message is translated. In a preferred embodiment, when a letter, number, symbol or abbreviation is entered that corresponds to the target message, the input is recognized and a feedback signal is transmitted to the player reflecting a successful match of the target letter. This feedback may comprise an auditory signal and visual signal such as the movement of a cursor on the display panel to the next target letter to be translated. As depicted in FIG. 3 the visual indicator is frame 350 that surrounds the letter "b" on the display, 330. Display 330 is shown displaying the target phase "what a b . . . " and wherein each of the letters in the target phrase comprise target letters. In this embodiment depicted in FIG. 3 a score is also displayed as play proceeds. In an alternative scoring heuristic the score is not displayed until a particular target message is completed. In the embodiment depicted in FIG. 3, the message is scrolled across the display panel as the translation proceeds. When the final input is recognized, the time elapsed is looked up by the CPU and a score is determined by the CPU based upon the time that has elapsed. In this arcade version, a ticket dispenser is then activated to dispense a number of tickets that corresponds with the calculated score.

It is also contemplated that play may progress with the display of the entire target text across the display panel. The letters, symbol or number or abbreviation that the player must translate is highlighted to the player by a visual indication on the display screen. Play continues and the player tries to select the correct button corresponding to the target message and, if necessary, like a phone keypad, the player may repeatedly press the button causing letters that correspond with pushing the buttons once, twice, three times etc, until a letter that matches the displayed letter is located. Then the player can select 0 button (or other designated control function) to lock in the selection and move to the next target letter. The faster the pace of play, the more points are awarded to the player. If the player erroneously passes the letter before locking it in and progressing to the next letter, the player must cycle through each of the letters, numbers, or symbols associated with the key until the correct symbol is entered. In one contemplated embodiment, the next letter in the target sequence may not be selected until a correct letter is entered and the command to move to the next letter is entered. As reflected in FIG. 3, the letters that are commonly associated with a conventional keypad are depicted.

In an alternative scoring embodiment a player proceeds to translate an entire target message and, when the player is satisfied with the data input, a send button may be actuated which causes the clock to stop. The completed translated message is then compared with the correct or accepted translations and provided a rank or score depending on the time elapsed and error rate. The score is stored in a memory and the process may be repeated. After a predetermined number of iterations are performed wherein the player inputs text messages, a final score is tabulated and, if the score meets award criteria, a number of redemption tickets are which correspond to the score.

In one embodiment of the invention, difficulty of play may be controlled by the speed at which the controller displays the next letter. If the player does not select the proper letter using the 'multi-press input with timeout', 'multi-press input with a next button', and 'two-key' method on the mobile phone style keypad, the computer either stops the game, or continues with that letter X'd or marked out until a determined number of missed characters is reached. In another embodiment scoring is based on the successful entry of a correct character that is entered before the next character is displayed by the processor. Incorrect entered characters, or characters not entered before the next letter is displayed results in a subtraction from the score.

Now referring back to FIG. 1, a view of the arcade game embodiment is depicted which includes a simulated phone keyboard 111 which is comprised of a plurality of buttons provided on cabinet 113 for manipulation by a player. Written instructions are provide on panel 117 which communicates to the player how to play the game. In alternative embodiments, the instructions may be displayed on the LCD display panels. The instructions may also provide to the player a list of recognized abbreviations or symbols that are recognized by the game program. An illustration of such abbreviations and symbols is provided in Tables 1 and 2.

The slot 121 of a ticket dispenser is provided on the front of the lower section of the cabinet. Also provided are debit card reader 130 and coin mechanism 131 which can accept credit from a player and allow activation of the game. On the top of the cabinet a 103 display screed 107 is provided which provides a display of the inputted text. In this embodiment the top LCD panel 105 can display the target message, or when the game is in an attract mode, merely display information about the game. In this embodiment a simulated antenna is also provided with flashing lights to make the cabinet attractive and resemble a conventional cell phone.

FIG. 3 depicts an embodiment of the device wherein a single LCD panel is used to implement the display features of the game. As best seen in FIG. 3 the input device includes an array that is the same as found in a conventional push button phone including numbers 1 through 9 and 0 (Zero) buttons. In this conventional arrangement numbers 2-9 are also assigned corresponding letters in the English alphabet. The buttons or keys 1-9 are arranged in a 3 by 3 array and the number 0 is provided below the middle column. While the arrangement of the keypad as depicted in FIG. 3 is conventional. It is contemplated that other push button phone arrangements may be used and more particularly when phones are adapted for use in countries using other languages that do not use a 26 letter alphabet. Also depicted are space input buttons, a free play button or credit button, a select game button and a start button or switch.

Instructions for the game are provided in a display area 321. In this embodiment, a portion of LCD panel 330 scrolls the target message for the user. The LCD panel will also displays a score to the player. While a LCD panel is used in a preferred embodiment, other electronic displays may also be used with the invention including cathode ray, plasma or LED displays. Also provided are coin slot 340 which directs coins or tokens to a coin acceptor which, upon the detection of a genuine coin or token will sends a signal to a central proceeding unit to activate a credit for play of the device. Which other forms of activation may be provided including debit or credit card scanners, dollar bill acceptors, etc. which are common in the arcade game industry. As best seen in FIG. 3, the screen depicts a highlighted letter W having a box around the target message letter. In order to successfully navigate play, the "9 button", which also corresponds to the letters WXY and Z must be selected until a W is displayed which corresponds to the highlighted letter on the screen, then the 0 button is activated to move to the H letter and the indicator or highlighter is moved forward. A score is awarded based upon the time it takes to locate, select and then move to the next letter which is displayed in a field on the bottom of the LCD panel. Play will continue until the target message is translated to a text message. Next, a total score is awarded and the ticket dispenser is activated and instructed to dispense a number of tickets that correspond with the score.

Figure 4:
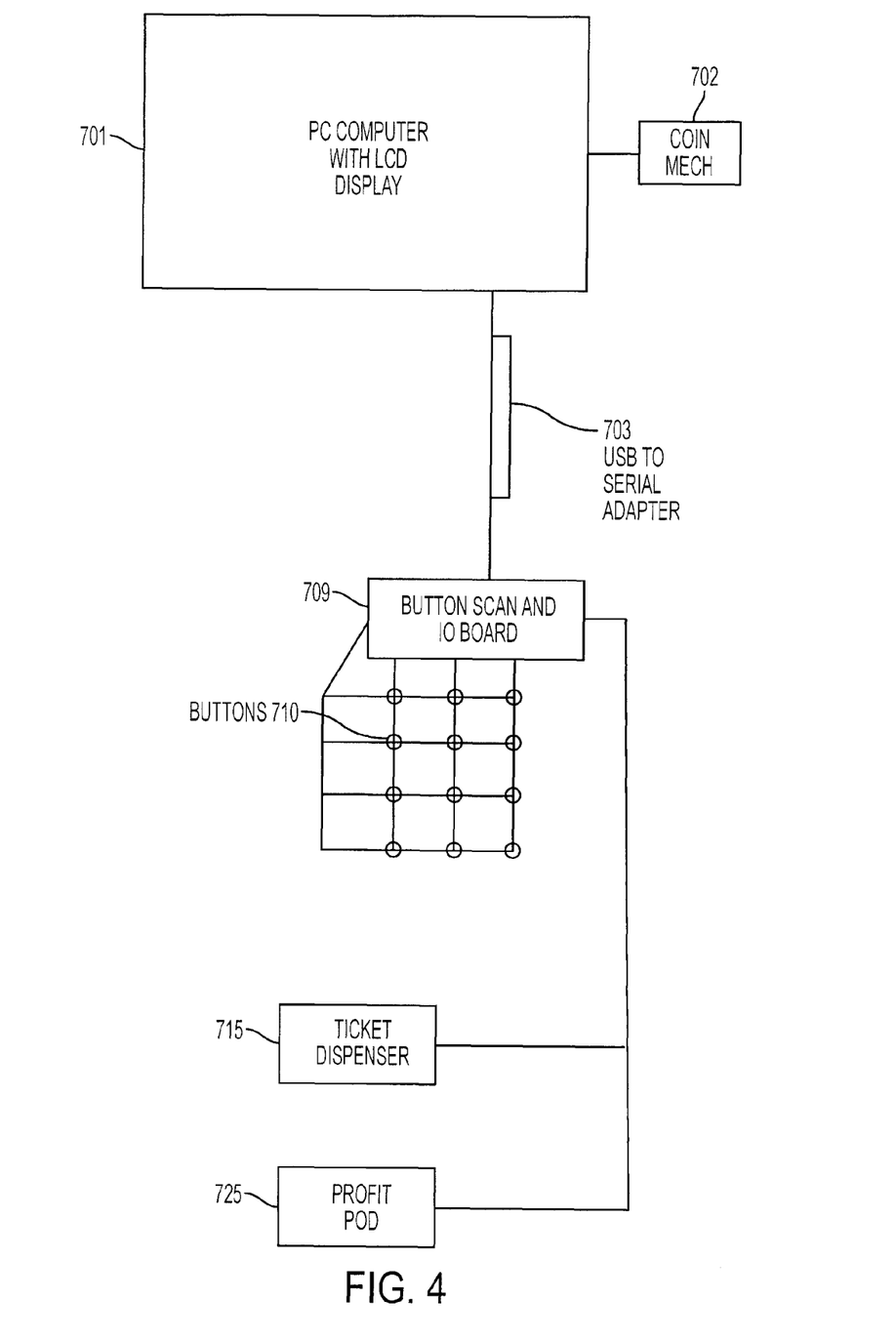
FIG. 4 is a schematic illustration of certain components of the system.

FIG. 4 represents a schematic of the electronic components that may be included in the game including a processor 702 (in this case a PC computer); a display 702 (in this case and LCD display) a USB to serial adaptor 703 that provides a signal from the keyboard button scan input output board 709 to the CPU. The buttons or switches 710 are connected to the button scan and IO board 709. Also connected to the CPU is the ticket dispenser 715 and a profit pod which describes a device 725 that can communicate via a wireless link information relating to the number of times a particular game ash been played. While in this schematic a PC is used as the processor and USB to serial adaptor is used for the input to the PC, it is contemplated that other CPUs may be advantageously used that can receive input and provide output to the components without the need for such adaptors.

Figure 5:
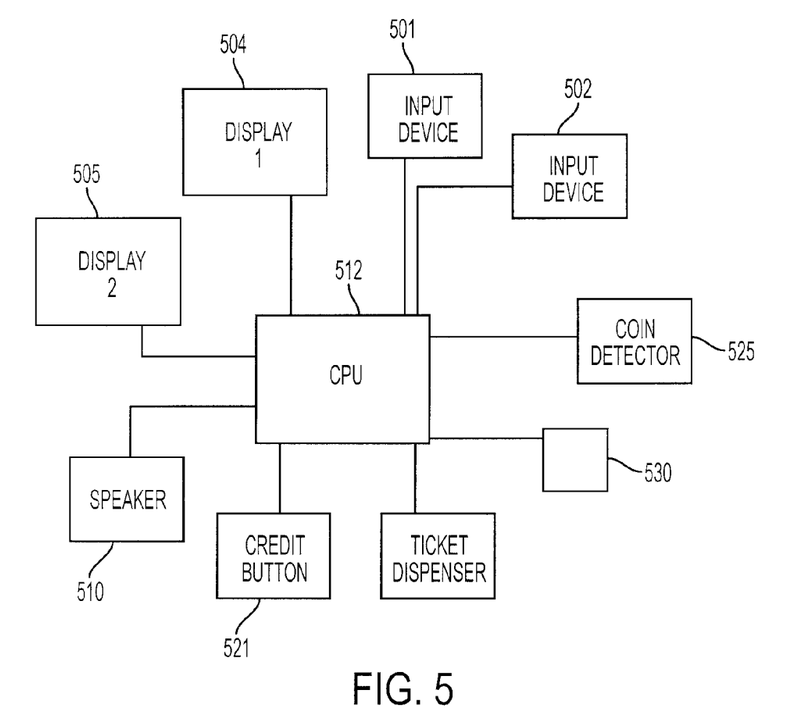
FIG. 5 is a schematic view of the components provided in the arcade version of the device.

FIG. 5 depicts a schematic illustration of a multiplayer device. It includes multiple input keypad devices 501 and 502 and multiple displays 504 and 505. Also illustrated is a speaker controlled by central processing unit 512 and ticket dispenser 515. The device is activated by credit actuator 520 which is enabled upon the detection of a credit from coin detector 525. The illustration also include a button 530 for the game selection such a game themes and single or multiplayer games.

Figure 7:
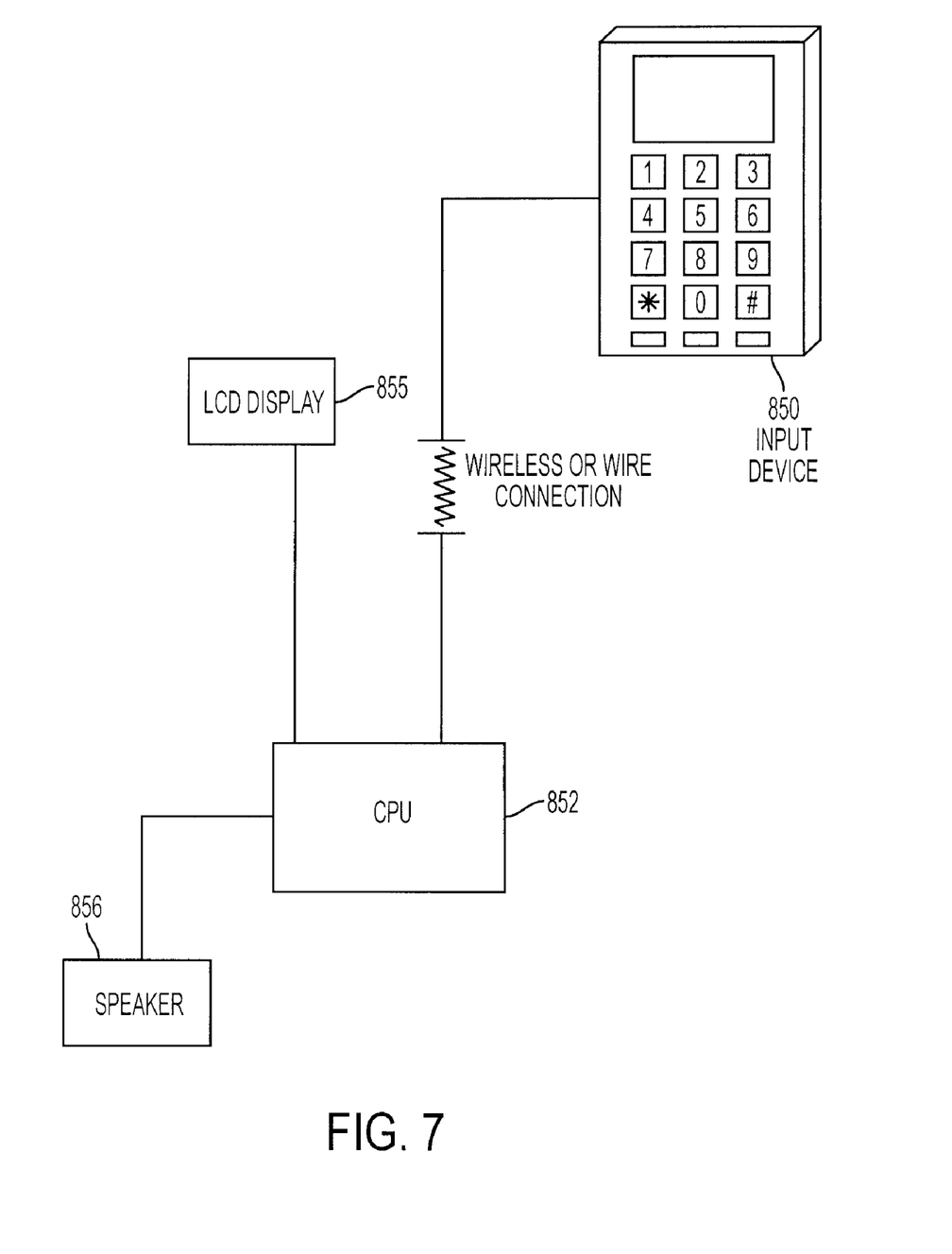
FIG. 7 is a schematic representation of an alternative embodiment of the invention which has been designed for home play.

FIG. 7 depicts an alternative embodiment of the game, referred to herein as the home version, both software and hardware is provided to a player that is compatible with a game counsel, such those manufactured by Nintendo Corp., Sony and Microsoft, or may be played using a personal computer. The play of the game proceeds as explained in connection with the alternative versions. In this home version embodiment, hardware in the form of a game controller 850 is provided to the player which simulates the keypad of a cellular phone and which provides input to the central proceeding unit 852 and additionally provides other input to operate the game software such as the game ignition and game selection functions. A display 855 and speakers 856 are also controlled by the CPU according to instructions provided on the game software and the input from device 850. In a first embodiment of the input device for the home version, the hardware is compatible with the game controller input ports and will operate a game software provided. In an alternative embodiment, the input device provides input to the game controller in using wireless interface and therefore the hardware further resembles a conventional cellular telephone handset. In an alternative embodiment the game is implemented on a personal computer of PC, the hardware keyboard input device may have USB interface.

Still referring to FIG. 7, the home version of the game includes an input device that provides input to a CPU which processes input according to the game program. In a preferred embodiment a plurality of input devices are provided to allow head to head competition. The input to the CPU includes both game operational instructions and the text message from the input device. The CPU provides output the Display which displays the target message, the text message and scoring information relating to the game. The CPU also provides output to a speaker which provides an auditory response for the input and other game features. For example the target message may be communicated over the speaker, and provide auditory signals based upon the correct input of text by a player. In the home version of the game, the play proceeds in a similar manner as in the arcade game. The game is initiated by accessing an initial menu that provides various game options to the player. The game options may include multi-player games as well as single player games. Contemplated multiplayer games may include head to head or side by side competition wherein two players simultaneously compete to translate a common communicated message. In an alternative multiplayer game, players may take turns translating messages that may be identical or have a similar length and difficulty level. As each round is completed, scores are calculated and the standings of the players are displayed.

A number of scoring methods and progression of play may be implemented with the game. For example, in one scoring scenario, the total time elapsed from the time of the communicated message to the time of receipt by the central processing unit of the entire translated text message is measured and given a value. The transmitted message is then compared to communicated message and the accuracy of the conversion is determined using a number of predetermined criteria. For example, a program may be provided to compare the transmitted target message to the communicated message and then provided point values for each error. These values are then used to reduce the total score based upon the speed of the transmission of the target message.

In an alternative embodiment, as discussed above, a player proceeds with the translation of each letter of the target message proceeds until the correct entry is detected by the CPU; only after the correct letter or other input is received will the CPU allow the player to progress to the next letter or other input of the message. Accordingly, in this embodiment there are no errors to determine and the score is based upon the speed of the input by the player. "Other input" referred to above may comprise spacing, punctuation, symbols or numbers.

In yet another embodiment, play may proceed as described in the proceedings paragraph but the player is provided with the maximum time in which to enter the translation of the target character. If a character is not selected within the predetermined time, the curser is moved to the next letter and play proceeds.

To initiate the game, a complete target message may be displayed to the player at the start of a round or the target message may be scrolled to the player as the message is translated. The player earns a score which is determined by the respective speed in which the target message is translated to the text message. The players score may be based upon the total time elapsed to complete the translation—less any errors—or be based upon the sum of the times for each correct letter that is entered by the player.

In an alternative embodiment of a scoring methodology, the score is determined by a combination of the speed in which the player completes the translation of an entire target message and additional value is awarded for using predetermined abbreviations. Recognized predetermined abbreviations may be displayed in a predetermined rule paradigm to the player, and thus skilled players may substitute such abbreviations for compete words and thereby reduce the time of the text transmission. In the event that a completed transmission has errors, these errors are assigned a value that is then deducted from a base score determined by the speed and number of correct abbreviations used. Thus, in a contemplated embodiment the target message may be abbreviated by the player according to predetermined phonetic equivalents of the respective words in the sentence or other predetermined abbreviations that are recognized by the central processor as representing the displayed term or terms. Common phonetic English transcriptions include "c" replacing "see", "u" replacing "you", "r" replacing "are", and combinations such as "c u" replacing "see you". Text messengers will often use thirteen letters in the English alphabet for homophonic single grapheme abbreviation. An exemplary list of sample abbreviations is provided in Tables 1 and 2.

The target text message or target characters may be a predetermined message, can be created depending upon the context of the game, or in one embodiment may be created or selected from a predetermined menu by the game players. In a preferred embodiment of the invention, a series of messages are pre-selected which may relate to a central theme, story, or include a song lyric, joke, or movie catch phrase to keep a high level of interest in the game. For instance a target message may comprise related messages that tell or suggest a story. As an example, the following first target message may be communicated "Meet me at the Mall and don't be late." This message may be conventionally translated to text or the player may use recognized abbreviations such as "Meet me at the mall ND dont B L8." The next message then would relate to an event or action at the mall or relate to an excuse why a person is running late for the meeting.

The general game concept may be implemented in a variety of manners by using software and various configurations of hardware.

Alternative Embodiment

Handheld Game

It is further contemplated that the game and game apparatus described above may also be implemented in a handheld game. The handheld device operates as the home version described above and includes an input device configured as a conventional phone keypad, a central processor, a display and a power source. In a contemplated embodiment of the handheld embodiment a plurality of hand held games may communicate with one another via wireless transmission thereby enabling head to head play and wherein the respective progress and score of each player is displayed on each of the networked devices.

Alternative Embodiment

Live Event Text Game

Figure 6:
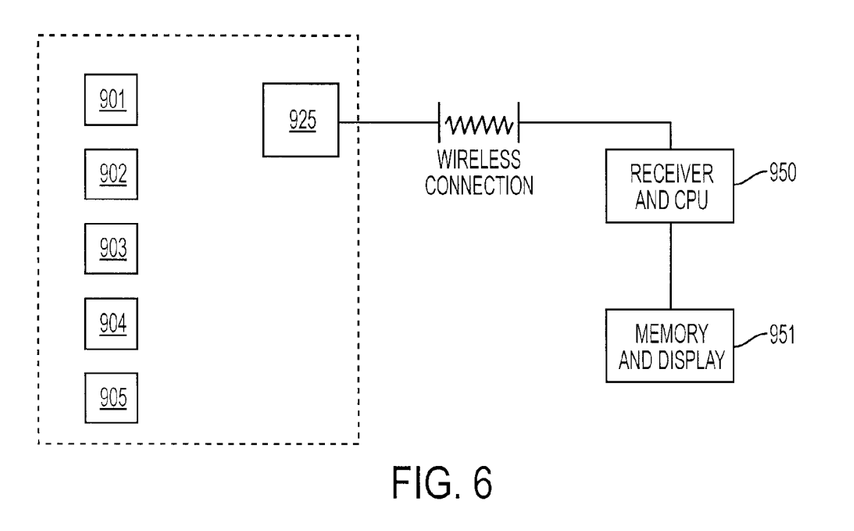
FIG. 6 is a schematic representation of a version of the invention wherein a target communication is provided to a plurality of players having cell phones which can transmit text messages to a receiver.

Now referring to FIG. 6, in a yet a further contemplated embodiment of the game, conventional cell phones 925 may be used. In this embodiment the target message may be communicated to a number of potential players who then can use cell phones 901-905 and 925 to rapidly translate the message into a text message and then transmit the message to a central receiver 950. For instance, a message may be simultaneously displayed or communicated to a number of players at a nightclub by a disk jockey, on a television program or in an arena, along with the phone number to transmit the message. The communication of the target message may be affected by verbal communication or by the visual display of the message. This embodiment allows for the multiple players to compete in a contest using their own personal phones. In instances where providing the information at a live event, the winning player may be awarded a prize at the event. The contest may provide for difference classes of prizes or different prizes for text messages that originate from conventional keypads in contract to those that originate from a qwerty keyboard.

The schematic representation of this embodiment of the invention is depicted in FIG. 6 wherein a plurality of cell phones 901-905 are associated with the text message 925 along with instructions regarding the transmission of the message. Messages are transmitted via conventional wireless networks to a receiver 950. The receiver then processes the messages according to a scoring program depending on the speed of transmission and an error rate and, in some embodiments the use of accepted abbreviations. Next the information from received calls is stored and may be displayed on a local display or the information may be converted to a web page where the players can have access to their respective scores. Prizes can be awarded to the individuals that meet scoring criteria by and can be contacted by responding to the address from which the text message originated. The live contest may also include the request for other transmitted information such as trivia or other questions.

It is contemplated wherein the display of the target message is provided from a first source such a television broadcast, cable broadcast, internet broadcast or any other public display, and the text may be entered using a conventional cellular phone and directed to a central address. For instance, a contest could be held at a nightclub or stadium or any public function that could be open to any participant that has access to a cellular phone. Organizers of the event would then provide the message to be texted and the address to send the message. The message could be verbally provided or be provided on a display of text. A receiver associated with the designated address would then receive the text messages, process the messages to see if the text was correct according to a predetermined judging criteria, award a score to the message and/or display the score.

As used herein, the term "text message" thus refers to both actual text messaging transmitted over wireless telephone system that may be employed in some of the embodiments of the invention as well as a simulated text message which comprises data entered from a game controller to the game processor which simulates the creation of a text message. The term generally refers to a message that is generated using a conventional pushbutton telephone keypad.

Actual text messaging that is sent over wireless networks is sent in to a short message Service Center (SMSC) which provides a store and forward mechanism. The SMSC attempts to send messages to the intended address. If the address cannot be reached, the SMSC queues the message for later retry. Some SMSCs also provide a "forward and forget" option where transmission is tried only once. Message delivery is described as best effort so there are no guarantees that a message will actually be delivered to its recipient and delay or complete loss of a message may occur. A user may choose to request delivery reports, which can provide positive confirmation that a message has reached the intended recipient. Transmission of the short messages between SMSC and phones can be done through different protocols such as SS7 within the standard GSM MAP framework or TCP/IP within the same standard. Limitations of the messages used within these protocols result in the maximum single text message size of either 160 7-bit characters, 140 8-bit characters, or 70 16-bit characters.

While each of the embodiments described above use a keypad, in yet a further alternative, a conventional phone keyboard is displayed visually on a touch screen. In yet a further contemplated alternative embodiment, the input device may be a floor pad that which is connected to a game console where the floor pad resembles a cell phone keyboard and the players activate the switches by application of pressure to locations on the floor pad.

High scores can be stored in a memory, with the player entering his or her name or initials beside the score using the mobile phone style keypad. In arcade or game console style games, multiple game controllers (generic processor or game console) could be linked together to allow competition play.

A number of alternative scoring systems may be used in with the invention which may provide score value to both speed and accuracy. In one contemplated scoring system a predetermined base score is provided and assigned to the message that is received first from the initiation of the display or publication of the message, all additional entries received are ranked in order of receipt. In an alternative scoring methodology, all completed translated text messages received by the CPU within a predetermined timed brackets is assigned the same base score. IN both of these scenarios, points are deducted from the base score in the event that errors are made in the translation. Points may be added for certain bonus feature such as predetermined phonetic spellings or abbreviations. Rules with respect to recognized phonetic spelling and accepted abbreviations are published and made available to the players.

In an alternative scoring embodiment of the arcade version of the game, the fastest score for a particular displayed message is posted and player can try to beat the high score within a predetermined time period.

While in the preferred embodiment the text that is used is English, the game may be adapted to other languages. For example platforms may be programmed to support the input of Asian languages (e.g. Japanese, Chinese, Korean) through a special system service called an Input Method. An input method is a software component that converts key presses into text input which can't be typed into the system directly. Input methods are normally used to input text for languages which have more characters than can fit on a standard keyboard. Input methods are commonly used for Japanese, Chinese and Korean but also show up in other languages like Thai and Hindi.

The following tables 1-4 provides exemplary abbreviations and homophones that may be used in connection with the game which can be programmed to be recognizes as reflecting correct or acceptable text messages in response to the target message: grammatical homophones are listed below:

TABLE 1

| Abbreviation | Definition |
| --- | --- |
| B | be/bee, bye |
| C | See |
| Cu | see you |
| F | If |
| I | eye, I |
| K | Okay |
| N | and, no, an, in |
| O | or, oh |

TABLE 1-continued

| Abbreviation | Definition |
|---|---|
| Q | Queue |
| R | Are/or |
| ru? | Are you? |
| S | Is |
| T | Tea, tee |
| U | You |
| Ur | you are, your |
| Y | why, yes |

Examples of Numeric Characters Replacing Homophones

TABLE 2

| Abbreviation | Definition |
|---|---|
| A3 | Anytime, anywhere, anyplace |
| activ8 | Activate |
| adctd2luv | addicted to love |
| 132 | Back to |
| B2b | back to business, back to back |
| B4 | Before |
| B4n, bfn | bye for now |
| cld9 | Cloud 9 |
| cr8 | Create |
| cu2moro | see you tomorrow |
| cu2nite | see you tonight |
| cul, CUL8R | see you later |
| cul8r alig8r n whl crcdl | see you later alligator, in a while crocodile |
| cw2cu | Can't wait to see you |
| D8 | Date |
| D8tng | Dating |
| db8 | Debate |
| dict8 | Dictate |
| dv8 | Deviate |
| E2eg | ear to ear grin |
| every1 | Everyone |
| F2f | face to face |
| F2t | free to talk |
| G2cu, g2sy | glad/good to see you |
| G2g | got to go |
| G2r | got to run |
| G9 | Genius |

Examples of Aphesis and Abbreviations

TABLE 3

| Abbreviation | Definition |
|---|---|
| Lo | Hello |
| Mob | Mobile |
| Mom | Moment |
| Rad | Radical |
| Sec | Second |
| Stats | your sex and age |
| Tel | Telephone |
| Tom | Tomorrow |
| W | with, were, where |
| @coll | at college |
| Add | Address |
| Attn | Attention |
| Brill | Brilliant |
| Bros | Brothers |
| Bye | Goodbye |
| cos, cuz, | Because |
| Fun | Funny |
| Info | Information |

Some Recognized Exemplary Words with Dropped Vowels are Listed Below

TABLE 4

| Abbreviation | Definition |
|---|---|
| Lch | Lunch |
| Fwd | Forward |
| Bn | been, being |
| Btr | Better |
| Chin | Chilling |
| Chlya | chill ya |
| Cn | Can |
| Dd | Dead |
| Emsg | Email message |
| Fst | Fast |
| Ftbl | Football |
| Mbrsd | Embarrassed |
| Msg | Message |
| Mtng | Meeting |
| Ppl | People |
| Rcvd | Received |
| Rgds | Regards |
| Spk | Speak |
| Sry | Sorry |
| Thn | Then |
| Txt | Text |
| Wckd | Wicked |
| Wk | Week |
| wknd, wkd | Weekend |
| @a hm | at home |
| @schl | at school |
| @wrk | at work |

We claim:
1. An amusement device comprising:
a display, said display for communicating a target message, said target message comprising target characters,
an input device, said input device comprising a plurality of input keys, said input keys arranged in an array and provided with indicia of numbers and letters and, said array in a conventional push button phone keypad configuration, said input keys providing an input to a controller,
said controller including,
operating logic associated with said input keys to provide a display of a graphic depiction of a letter in response to a selection by a user using said input keys of a text character corresponding to said target message character, said selection comprising a translation, and,
said controller providing a signal to display a visual indicator to identify said target message character for translation, and said controller further comprising a processor to determine if the translated input character is in conformance with predetermined criteria reflecting a correct response, and said controller processing further comprising a scoring heuristic, said scoring heuristic for assigning a score to said input, said score being based upon the time elapsed from the display of said target character to the entry of a correct response.

2. The device recited in claim 1 further comprising an actuator for initiation of the play of said game, said game actuator being activated in response to the detection of a coin, token or other credit.

3. The device as recited in claim 1 further comprising a ticket distributor, said ticket distributor in communication and controlled by said controller, wherein the event that a predetermined score correlates with an award of tickets, the controller sends a signal to said ticket distributor to dispense tickers.

4. The device as recited in claim 1 further comprising speakers which are activated by said controller in response to a successful translation of said target character to a text character.

5. The amusement device recited in claim 1 further comprising a coin acceptor to recognize genuine credits to the system and an activation switch to initiate the display of said target message and to activate said keypad so that said central proceeding unit will recognize signals from said input keys.

6. The amusement device recited in claim 1, wherein said input keys further comprises a 12-key input key pad having 12 input keys arranged in a 4×3 array configuration for entry of at least a selected one of alphabet and numeric data, and said first input key being one of said 12 input keys.

7. The amusement device as recited in claim 1, wherein said input device used to translate the target messages is a handheld device.

8. The amusement device as recited in claim 1, wherein the input device used to translate the target messages is a handheld wireless device in communication with a central processing unit.

9. The amusement device as recited in claim 1 wherein the input device used to translate the target messages is a touch screen that simulates a conventional push button phone keypad.

10. The amusement device as recited in claim 1 wherein said scoring heuristic further comprises the calculation of a countdown number based upon the time elapsed from the display of a target letter to the input of a correct translated to text letter.

11. The amusement device as recited in claim 1 further comprising a second input device and second display wherein at least two players may be provided with an identical target message at the same time to translate and the central proceeding unit provides a display of the respective scores earned by two players.

* * * * *